(12) United States Patent
Hosoe et al.

(10) Patent No.: US 7,835,087 B2
(45) Date of Patent: Nov. 16, 2010

(54) METHOD OF PRODUCING A LENS

(75) Inventors: Shigeru Hosoe, Hachioji (JP); Kiyoshi Yamashita, Hachioji (JP); Nobuyoshi Mori, Hachioji (JP); Yuichi Atarashi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 12/286,403

(22) Filed: Sep. 30, 2008

(65) Prior Publication Data
US 2009/0115082 A1     May 7, 2009

Related U.S. Application Data

(63) Continuation of application No. 10/651,534, filed on Aug. 29, 2003, now abandoned.

(30) Foreign Application Priority Data

| Sep. 5, 2002 | (JP) | ............................. 2002-259878 |
| Dec. 25, 2002 | (JP) | ............................. 2002-373844 |

(51) Int. Cl.
G02B 27/10     (2006.01)
G02B 13/18     (2006.01)
G02B 3/02      (2006.01)

(52) U.S. Cl. ...................... 359/719; 359/620

(58) Field of Classification Search ......... 359/619–626, 359/664, 719; 65/162, 404
See application file for complete search history.

(56) References Cited

U.S. PATENT DOCUMENTS

| 4,868,261 | A | 9/1989 | Kobayashi et al. |
| 6,650,469 | B2 | 11/2003 | Kim et al. |
| 6,832,495 | B2 | 12/2004 | Hosoe |
| 2001/0005344 | A1 | 6/2001 | Nakano |
| 2003/0048740 | A1* | 3/2003 | Nagoya et al. ......... 369/112.28 |

(Continued)

FOREIGN PATENT DOCUMENTS

JP     09-328319     12/1997

(Continued)

OTHER PUBLICATIONS

Japanese Office Action (with English translation) dated Jan. 27, 2009 issued in the corresponding Japanese Patent Application No. 2002-373844.

*Primary Examiner*—Alicia M Harrington
(74) *Attorney, Agent, or Firm*—Cohen Pontani Lieberman & Pavane LLP

(57) ABSTRACT

A method of producing a lens that includes shifting a first die relative to a second die, and pressing an optical material shaped in a preliminary form between the first die and the second die so as to form a lens having a configuration corresponding to a hollow portion formed by the first die and the second die while shifting the first die relative to the second die. The produced lens includes an effective optical surface configured to converge a light flux. The effective optical surface includes a light entrance side, a light exit side, and an optical axis. The effective optical surface is a convex surface shaped such that when a maximum normal line angle is defined as an angle formed between the optical axis and a normal line at the outermost circumference of the effective optical surface, the maximum normal angle is 60° to 90°.

8 Claims, 7 Drawing Sheets

U.S. PATENT DOCUMENTS

| | | |
|---|---|---|
| 2003/0072247 A1 | 4/2003 | Hirai |
| 2003/0102583 A1* | 6/2003 | Hirota et al. ............ 264/2.7 |
| 2004/0095875 A1 | 5/2004 | Arai et al. |
| 2004/0213134 A1 | 10/2004 | Takada et al. |
| 2007/0195263 A1* | 8/2007 | Shimizu et al. ............ 351/168 |

FOREIGN PATENT DOCUMENTS

| | | |
|---|---|---|
| JP | 2001-297471 | 10/2001 |
| JP | 2001-299711 | 10/2001 |
| JP | 2001-324673 | 11/2001 |
| JP | 2001-341134 | 12/2001 |
| JP | 2001-353729 | 12/2001 |
| JP | 2003-251650 | 9/2003 |
| JP | 2004-291607 | 10/2004 |

* cited by examiner

Prior Art

PRIOR ART

METHOD OF PRODUCING A LENS

CROSS REFERENCE TO RELATED APPLICATIONS

This application is a continuation of U.S. patent application Ser. No. 10/651,534, filed Aug. 29, 2003 now abandoned. Priority is claimed for this invention and application, corresponding applications having been filed in Japan on Sep. 5, 2002, No. 2002-259878 and Japan on Dec. 25, 2002, No. 2002-373844, respectively.

BACKGROUND OF THE INVENTION

Field of the Invention

The present invention relates to a method of producing a lens.

When forming a formed lens through hot press-forming, there is conducted a series of processes wherein a primary processed product (pre-form or preliminary form) representing an optical material which is almost spherical is heated, then, the pre-form is interposed by opposing optical transfer surfaces of a forming die to be pressed, and surfaces of the pre-form are brought into close contact with optical transfer surfaces of the forming die by its pressure so that optical surface shapes may be transferred, and the pre-form is cooled and solidified, and after that, the opposing dies are opened and the formed lens is taken out.

In this case, since there is caused microscopic fluctuation or polarization by scattering of forming conditions in hot press-forming, a shape of an optical transfer surface of the forming die is not always transferred strictly to be an optical surface shape of a formed lens. Therefore, if the shape of an optical transfer surface of the forming die is not processed highly accurately, the optical surface obtained through transfer of that optical transfer surface has further deviation from the design value. It is therefore necessary to form a forming die accurately to the utmost. However, an optical transfer surface of a forming die that forms a formed lens having a convex optical surface, for example, is a concave surface, and when manufacturing a forming die for forming a formed lens having a large maximum normal angle formed by a normal line at a point on a convex optical surface and by an optical axis, the concave optical transfer surface is in a deep shape, which causes a problem that a large tool cannot be used in processing a forming die because it is difficult for the large tool to enter, and a small tool needs to be used for processing, and in that case, premature abrasion of a tool tends to be caused, changing a tool shape and changing processing power, which makes it difficult to create the optical surface shape highly accurately. Therefore, it has been common sense in design for manufacturing small-sized lenses to make the maximum normal angle (details will be described later) not to be large in terms of design as far as possible.

Baking the maximum normal angle of the optical transfer surface of a forming die not to be large as far as possible means that the maximum normal angle of the convex optical surface shape is made to be small on the optical surface shape of the formed lens, and it corresponds, in other words, to that the refracting power of the optical surface is made to be small. In other words, this means manufacturing of a lens by the use of a design method to raise a refractive index of a lens material, to lessen a distance (section thickness) of optical surface of a lens, or to reduce power load of an optical surface by increasing the number of lenses. Forming dies for forming a formed lens based on the conventional design mentioned above are disclosed in TOKKAI No. 2001-341134

However, when creating a lens having a convex form having a small maximum normal angle obtained by the conventional design method, namely, having a gentle gradient (which means that an angle for the surface that is perpendicular to an optical axis is smaller), by means of hot press-forming, there exist the following problems, although processing of an optical transfer surface of a forming die is relatively easy.

FIGS. 1(a) and 1(b) are schematic sectional views of a forming apparatus in which an optical material is subjected to press-forming to obtain a conventional lens having a convex form having a gentle gradient. FIG. 1(a) shows the state wherein upper die 1 facing lower die 2 descends along die barrel 3, and optical transfer surface 1a of the upper die 1 comes in contact with heated pre-form PF which is almost spherical and is placed on optical transfer surface 2a of the lower die 2. FIG. 1(b) shows the state wherein the press-forming has been advanced further, and lens L having thereon the transferred optical transfer surfaces 1a and 2a has been created.

A distance from the position of the upper die 1 shown in FIG. 1(a) to the position of the upper die 1 shown in FIG. 1(b) is press stroke S for press-forming, and as is apparent from these figures, when the gradient of the optical transfer surface is needed to be gentle, the pre-form which is almost spherical is required to be deformed greatly (to become thinner), and the press stroke S tends to be large. On the other hand, when the optical surface of the formed lens needs to be transferred and formed highly accurately in the hot press-forming, the pre-form PF is required to be softened sufficiently first so that its viscosity is mostly uniform up to its center. In other words, a temperature of the pre-form PF needs to be uniform accurately from its surface to its center in the hot press-forming, because viscosity of the pre-form PF fluctuates sharply depending on temperatures.

Further, in the case of an optical material, it needs to be heated for a long time when it is kept totally at a certain temperature highly accurately, because the thermal conductivity of the optical material is extremely low, even when it is plastic or glass. Therefore, if the pre-form PF is heated by the use of an internal heater after the pre-form PF is put in the forming die, a forming cycle turns out to be extremely long, namely, the time for the optical material to occupy the forming die grows longer, and productivity declines accordingly. Further, the forming die is exposed to an intense heat for a long time, and its life is shortened, resulting in an increase of expenses for replacement of forming dies. Though it is also possible to heat the pre-form PF before it is put in the forming die, there still is a fear that a forming system becomes complicated and expensive, resulting in an increase in a rate of troubles of the system and a decline of productivity.

Since the press stroke S is long in the hot press-forming process as stated above, when conducting highly reproducible press, an optical material is required to be deformed gradually under the well-controlled condition in the course of pressing, and the time required for pressing tends to be long. Therefore, the time for the optical material to occupy the forming die becomes longer, and productivity is further declined. Further, the optical material that is totally of the uniform viscosity means that the optical material is in the state wherein it is totally close to liquid uniformly, and therefore, it means that flow deformation is caused until the moment when the optical material is totally cooled and solidified. In particular, the tendency that pressure for pressing against optical transfer surface 1a of upper die 1 is lost by the flow grows greater, and thereby, the optical material is hardly pressed against optical transfer surfaces 1a and 2a of the forming dies under the high pressure, causing the trend that transferability of the optical surface of lens L is worsened. In other words, when compared with an occasion where an amount of press deformation of pre-form PF is small, control of press conditions is relatively difficult and possibility of an increase in dispersion for forming is high. In particular, when the forming dies have on their sides of optical transfer surfaces 1a and 2a the microscopic forms for the purpose of forming, on an optical surface of a lens, microscopic structures such as a diffracting groove that generates diffracted light, its influence is exerted remarkably, and optical materials are not filled sufficiently in a trough of the microscopic structure, resulting in a fear of generation of troubles that an edge portion of the microscopic structure of lens L formed finally becomes dull. In short, in the conventional hot press-forming, highly accurate forming is difficult unless press conditions are established strictly.

In the cooling process, the forming dies need to be held even after pressing, because deformation such as shrinkage caused by cooling is generated until the moment when the optical material is totally cooled and solidified, and this needs to be controlled, thus, the cooling time turns out to be long, and the time for the optical member to occupy the forming dies is further extended, and productivity is lowered.

In creating a lens having a shape of convex optical surface with a gentle gradient as in the past, each of heating process, pressing process and cooling process has a problem, which makes highly accurate and highly efficient creation of a lens difficult. In particular, in an optical pickup device for conducting recording and reproducing of high density information for the advanced DVD, it is necessary to use a light source having a shorter wavelength, and therefore, a lens used in the optical pickup device, an objective lens, in particular, is desired to be a formed lens which is more accurate. However, the lens designed by a conventional way is close to the limit of improvement in accuracy, and there has become pressing the need to create a lens with a novel concept which is different from the conventional design method.

SUMMARY OF THE INVENTION

The present invention has been achieved in view of the problems caused by the conventional technologies, and its object is to provide a method of producing a lens capable of obtaining a form of higher accuracy and realizing high optical performance with low cost, the formed lens being usable in a highly efficient optical pickup device.

A formed lens described herein is represented by a formed lens created by press-forming an optical material wherein the maximum normal angle among those each being formed by a normal line at an optional point on at least one optical surface and by an optical axis is not less than 60° and is not more than 90°, and a position where a normal line forming the maximum normal angle intersects the optical axis is closer to the lens than at least one optical surface stated above, while, Abbe's number vd is not less than 60.

In one aspect, the invention involves a method of producing a lens. The method includes shifting a first die relative to a second die, and pressing an optical material shaped in a preliminary form between the first die and the second die so as to form a lens having a configuration corresponding to a hollow portion formed by the first die and the second die while shifting the first die relative to the second die. The lens includes an effective optical surface configured to converge a light flux. The effective optical surface includes a light entrance side, a light exit side, and an optical axis. The effective optical surface is a convex surface shaped such that when a maximum normal line angle is defined as an angle formed between the optical axis and a normal line at the outermost circumference of the effective optical surface, the maximum normal angle is 60° to 90° and a maximum normal line forming the maximum normal line angle intersects with the optical axis at an intersection located at the light exit side of the point of the maximum normal line on the optical surface. The preliminary form of the optical material is shaped such that a sphere having the same volume of the preliminary form is defined as an equivalent sphere. The surface of the preliminary form is located in a space between a spherical surface of a half sphere with a radius that is a half of the radius of the equivalent sphere and a spherical surface of a double sphere with a radius that is a double the radius of the equivalent sphere.

In one embodiment, the maximum normal angle is 70° to 90°. In another embodiment, Abbe's number vd of the optical material is 60 or more. In still another embodiment, the optical material has a refractive index not larger than 1.61 for d-line. In yet another embodiment, the optical surface includes microscopic structures. In another embodiment, the microscopic structures are diffractive grooves. In other embodiments, when a normal line does not intersect with the optical axis, the normal angle is an angle formed between the optical axis and a line obtained by projecting the normal line on a plane that is parallel to the normal line and includes the optical axis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
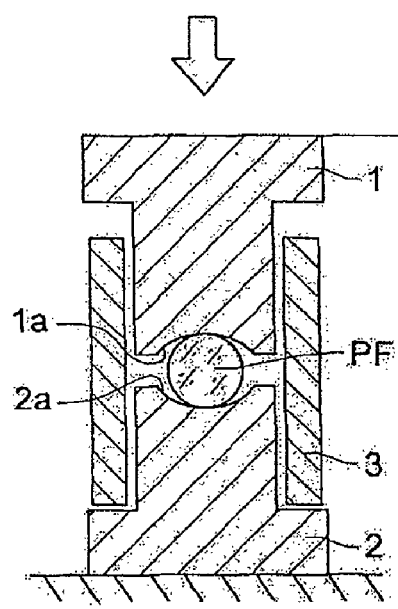
FIGS. 1(a) and 1(b) are schematic sectional views of a forming apparatus in which an optical material is subjected to press-forming to obtain a conventional lens having a convex form having a gentle gradient.
Figure 1B:
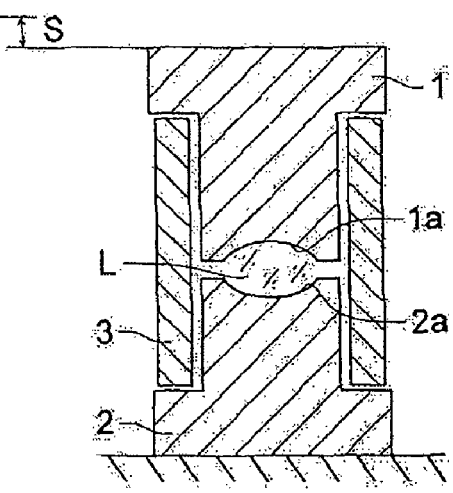

In view of the aforementioned problems, the inventors of the invention examined whether designing the gradient of the convex optical surface shape to be as gentle as possible only for easiness of processing by the forming die is really advantageous or not for realizing production of highly accurate and highly efficient lenses, and invented a formed lens that can avoid the conventional weak points radically. Advantages of the invention will be explained more concretely.

The convex optical surface shape in axial symmetry where a maximum normal angle is large (maximum normal angle is not less than 60° and is not more than 90°) as in the formed lens described in Item (1) is closer to a hemispherical form than a conventional lens form, and thereby, it is possible to reduce an amount of deformation from an optical material such as a primary processed item (pre-form) in the case of press-forming. Therefore, it is not necessary to heat uniformly to the center of the optical material such as a pre-form even in the case of hot press, and it is possible to shorten the forming cycle extremely because the press stroke is small. Further, the transferability of an optical surface shape is excellent, because it is possible to keep the pressure to be high for pressing an optical material against the optical surface transferring surface of the forming die to be close contact, from the early stage in the case of pressing. In short, it is possible to realize press-forming that is higher in accuracy and higher in speed than the conventional press-forming.

However, as s side effect for the large maximum normal angle, there is caused a problem that a deflection angle grows greater and a difference of a refraction angle caused by a wavelength of an incident light flux grows greater, because a normal angle of its incident optical surface becomes an incident angle of a light flux, and thereby, an incident angle becomes greater when a normal angle is greater, and an incident light flux enters the optical surface, making a small angle with the optical surface, when the incident light flux is a collimated light that is in parallel with an optical axis of the formed lens. Namely, if the dispersion is one for general conventional optical materials, doubling corresponding to that appears greatly. Therefore, the maximum normal angle on the optical surface of the lens is made to be large, an optical material having small dispersion (having large Abbe's number) is selected. Namely, by selecting an optical material whose Abbe's number vd is 60 or more, it was possible to manufacture a highly accurate formed lens having high optical efficiency in which chromatic aberration is hardly caused.

In this case, the inventors of the invention first inspected easiness of manufacture for a highly accurate forming die having a deep concave optical transfer surface which is needed for forming a formed lens having a convex optical surface with a large maximum normal angle like one described in Item (1). With respect to materials for a forming die, when an optical material is plastic, electroless-plated nickel is used, and an optical transfer surface is generally created through cutting by a diamond tool and a super precision lathe. Accuracy of the point of a blade of a diamond tool has been improved greatly in recent years, and an R tool having circularity of 30 nm or less and a cone point tool having a width of a tip of the point of a blade of 1 µm or less are on the market to be available easily. Even in the case of a super precision lathe, a highly precise lathe whose axial resolving power is 1 nm can be used. In the case of electroless-plated nickel representing a material for a forming die, high machinability materials disclosed in TOKKAI No. 2001-353729 have already been developed by the inventors of the invention, and have been put to practical use. Accordingly, it has become clear that creating of a forming die for a formed lens having a convex optical surface on which a maximum normal angle is large is not difficult, as far as the plastic lens is concerned, and it is not necessary to design a lens optical surface shape to have a slight tilt for that purpose.

On the other hand, when using glass for the optical material, processing-resistant materials such as ceramic or carbide have generally been used as a material for a forming die, because a temperature for pressing is as high as 500-600° C. generally. For creating a concave optical transfer surface on this material for a forming die through processing, it is general to conduct grinding processing by a diamond grindstone and a super precision lathe and to conduct polishing processing as a subsequent processing. In this case, when creating a deep concave optical transfer surface shape for transferring a convex optical surface with a large maximum normal angle on a forming die, a dimension of a grindstone has been required to be small in the past, and there has been a problem that a decline of grinding ratio accelerated abrasion of the grindstone or the state of a cutting edge was not stabilized. Nowadays, however, it is not so difficult to create an optical transfer surface, compared with the past, owing to the progress of grinding processing technologies including that a load on a grindstone was lightened by a method of parallel grinding in which an axis of grindstone is laid out in a feeding plane, and an optical transfer surface having excellent surface roughness and shape accuracy can be created relatively easily, and that a technology to stabilize a grindstone cutting edge at an excellent state by using electrolysis like ELID grinding has been put to practical use. Further, in the field of glass materials, the trend for low Tg has been advanced, and glass materials having press temperature of 300-350° C. are also on the market to be available easily. As the optical material of this kind, K-PG325 introduced by Sumita Kogaku Co. to the market can be used. From the foregoing, there is an actual condition that necessity of using processing-resistant materials such as ceramic or carbide for the material of a forming die has been reduced.

Further, in the conventional forming method, when forming a lens having an optical surface on which a maximum normal angle is large, a radius of a mostly spherical pre-form is sometimes greater than a central radius of an optical transfer surface of a forming die, for example, and thereby a phenomenon that gas accumulation is generated at the central portion of the optical surface to worsen formed-ability was sometimes caused. At present, however, a method to make the forming cavity to be vacuum in the course of press-forming has been put to practical use, thus, it is possible to realize highly accurate forming without generating gas accumulation.

A lens having an optical surface on which a maximum normal angle is large is in a trend that a tolerance for decentering (shifting of an optical axis) of an optical surface is generally lowered, and it is necessary to control decentering between dies facing each other to be extremely small in the course of forming. In the structure of a conventional forming machine, it was difficult to control this decentering. However, it has become possible to control and adjust the die decentering on an extremely high accuracy basis by the structures of quite novel forming machines disclosed in TOKKAI No. 2001-341134 and TOKUGAN Nos. 2002-055241 and 2002-142709 proposed by one of the inventors of the invention. The aforementioned viewpoint makes it to say that forming of highly accurate lenses has become easy.

The actual condition stated above makes it to say that the conventional technical common sense that "the maximum normal angle on a lens optical surface should be made small for easiness of die processing and forming" has now been overthrown by advancement of processing technologies and development of novel optical materials. Namely, it has been proved that solving the aforementioned conventional problems in hot press-forming drastically and ensuring high productivity of highly accurate and highly efficient lenses can be attained by making the maximum normal angle positively against the conventional technical common sense.

By making the maximum normal angle to be large, a shape of an optical surface of a formed lens approaches a hemisphere, and thereby, an amount of press deformation of a pre-form which is almost spherical, for example, can be reduced and a press stroke can also be reduced to half. Further, it is not necessary to soften the whole optical material such as a pre-form because the amount of press deformation is small, and a portion near the surface of the optical material such as a pre-form has only to be in viscosity that allows deformation at the highest temperature, thus, the processing time can be shortened sharply, and flow deformation in the course of forming is hardly caused and pressing pressure becomes high because a portion near the center of the optical material such as a pre-form can be made to be at high viscosity and in the state near a solid body in the course of forming, thus the optical material can be brought into close contact with the optical transfer surface of the forming die by the great force, which makes the forming transferability to be extremely excellent. In particular, when a diffracting groove or the microscopic structure for prevention of reflection is provided on the surface of an optical surface, a trough portion of the forming die can also be filled with optical materials, and an edge portion of the microscopic structure on the lens optical surface does not become dull.

Since it is possible to shorten the forming time including heating, pressing and cooling, even in the case that the forming die is exposed to high temperature in a single forming, the time for that exposure can be shortened, and the time for oxidation of the optical transfer surface at high temperature and for receiving damages of the forming die caused by reaction with optical materials is shortened, resulting in a life of the forming die that is longer than that in the past. Therefore, it is possible to reduce the running cost of the forming die and to reduce forming cost because frequency of interruption of forming caused by replacement of forming dies resulted from damages of the forming die is reduced, and output can be kept high by the improved rate of operation of a forming machine.

Since it has been impossible to use lenses other than the lens having a small maximum normal angle, when great power is needed, the power born by each optical surface has been dispersed by increasing the number of lenses. In this case, if one lens, for example, is increased to two lenses, the forming cost is doubled, and further, lens frame parts for incorporating the two lenses are needed, thus, incorporating errors are increased, and time and cost for the incorporating and inspection for the incorporated stated in addition to inspection for a single lens are necessary, thereby, the manufacturing cost has been doubled or more, which can be lessened to half or less by one effort. Namely, the invention makes it possible to obtain an effect that the cost is half or less of that in the past when manufacturing lenses while ensuring the accuracy, efficiency and production yield which are higher than those in the past.

Figure 2:
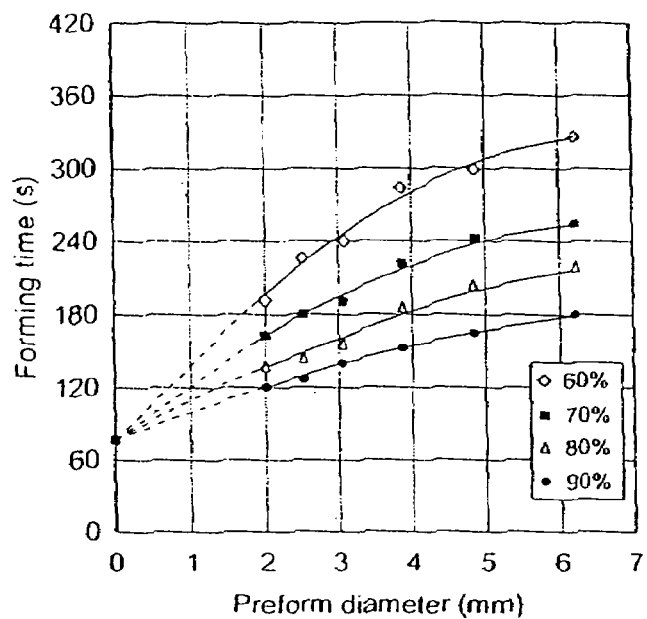
FIG. 2 shows a graph wherein a diameter of a spherical pre-form is represented by the horizontal axis and a forming time for heating, pressing and cooling in the forming die is represented by the vertical axis.

Incidentally, with respect to the relationship between a press stroke and the forming time, there has been published basic data in S. Hosoe and Y. Masaki "High-speed glass-forming method to mass-produce precise optics", SPIE Vol. 2576 pp 115-120, 1995 representing a result of the joint study of those including a person in the inventors of the invention. FIG. 2 shows a graph which is a part of the results of the study.

In FIG. 2 wherein a diameter of a spherical pre-form is represented by the horizontal axis and a forming time including heating, pressing and cooling in the forming die is represented by the vertical axis, there are plotted four kinds of graphs depending on how much percent of the pre-form diameter is a thickness of the pre-form after pressing. For example, in the case where the pre-form diameter is 6 mm and a thickness after pressing is 60%, namely, in the case where the press stroke is 40%, this forming method requires a forming time of 330 seconds. However, even in the case of the same pre-form diameter, if the thickness after pressing is 90%, namely, if the press stroke is 10%, the forming time is shortened to 180 seconds which is mostly a half. This relates only to a forming process, and it shows that productivity of a lens in one kind is mostly doubled.

If the power is dispersed and the number of lenses is increased from one to two for reducing the maximum normal angle, and if the maximum normal angle is reduced from 75° to 45°, the press stroke is increased from 10% to 30% of a diameter of the pre-form which is mostly spherical. If this is viewed in FIG. 2, when a pre-form diameter is 3 mm, the forming time for a single lens with maximum normal angle 75° is about 140 seconds and that for one of two lenses with maximum normal angle of 45K is about 195 seconds, and the forming time ratio is 1:1.4. Since the latter is in the case of two lenses, if the foregoing is taken into consideration, the forming time ratio is 1:2.8, resulting in a difference from the forming productivity which is almost three times higher. Moreover, since double forming dies are needed, a burden for forming die processing is not reduced even when changing to a two-element lens to make the maximum normal angle to be small, and there is a possibility to be rather increased by the aforementioned progress of processing technologies.

The inventors of the invention verified as follows regarding the minimum value of the maximum normal angle which offers the aforementioned effect remarkably.

First, with respect to the upper limit of the maximum normal angle, when it exceeds 90° at which the optical surface is almost close to a semispherical shape, an undercut is caused on the forming die, resulting in that a formed lens cannot be removed from a forming die after forming. It is therefore possible to mention that "the upper limit of the maximum normal angle is 90° or less".

Figure 3:
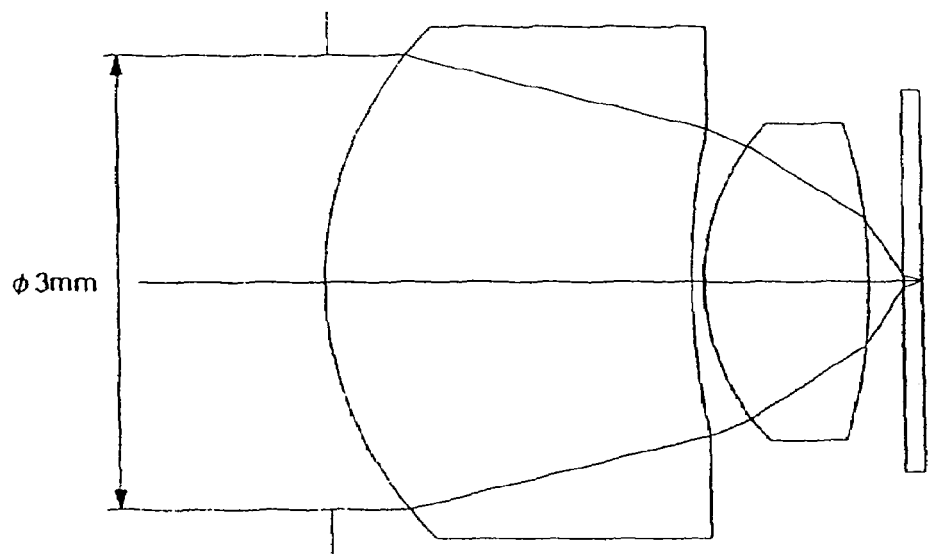
FIG. 3 is a sectional view of a prior art two-element lens used in an optical pickup device.
Figure 4:
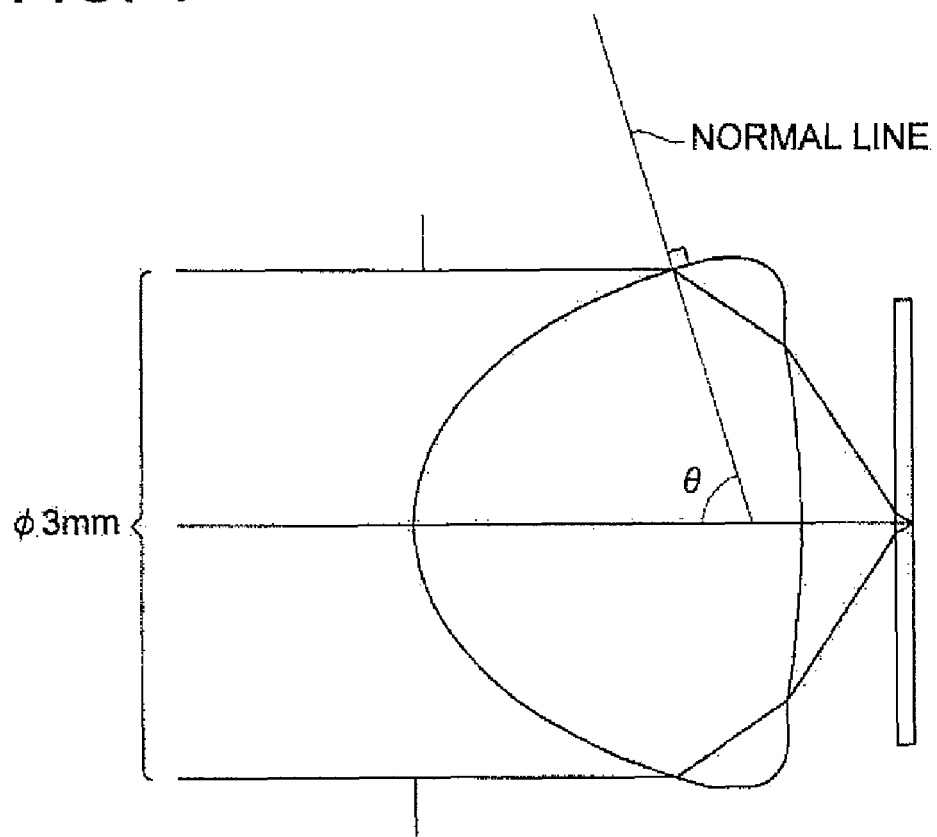
FIG. 4 is a sectional view of a single lens used in an optical pickup device.

Next, with respect to the lower limit of the maximum normal angle, when an objective lens for an optical pickup device that is considered to be a lens with the greatest power is taken as an example, if a two-element objective lens is structured by using an optical material having image-side numerical aperture NA of 0.85 and a refractive index of about 1.5, its section shows a sectional shape indicated in FIG. 3, and its maximum normal angle is 37° on an incidence-side optical surface (third surface when counted from the light source side) of a second lens (lens on the right side in FIG. 3). FIG. 4 shows one wherein the specifications which are mostly the same as the foregoing are designed optically on a single lens, and its maximum normal angle (θ in FIG. 4) is about 72° on the first surface. Between the both lens types mentioned above, there is caused a difference in maximum normal angle of 35° which is shown, together with a pre-form diameter, a press stroke and others in this case, in Table 1.

TABLE 1

| NA0.85 | | Optical surface | Refractive index nd | Abbe's number vd | Maximum normal angle | Axial thickness | Volume | Equivalent preform diameter | Lens thickness ratio |
|---|---|---|---|---|---|---|---|---|---|
| Two-element lens | | First surface of first lens | 1.50914 | 56.5 | 37° | 2.5 mm | 20.1 mm³ | 3.374 mm | 74.0% |
| | | Third surface of second lens | 1.54351 | 56.7 | 37° | 1.0 mm | 2.6 mm³ | 1.706 mm | 58.6% |
| Single lens | | First surface | 1.50670 | 70.5 | 72° | 2.2 mm | 9.5 mm³ | 2.628 mm | 83.7% |

With respect to a press stroke, it is 0.87 mm for the front lens (first lens) and 0.7 mm for the rear lens (second lens) in the case of a two-element lens, and it is 0.4 mm in the case of a single lens. A percentage of a thickness of the formed lens excluding a press stroke for a diameter of a true sphere imagined from a pre-form shape is respectively 74%, 59% and 84%. When this value is greater, it means that an amount of deformation of a pre-form in forming is less which is advantageous in terms of uniformity of the pre-form temperature, pressing time and improvement of transferability by an increase of pressing pressure. Based on this value, if the forming time is estimated by interpolating and extrapolating the graph in FIG. 2, it is 190 sec. for the front lens and 230 sec. for the rear lens in the case of a two-element lens, and it is 140 sec. in the case of a single lens. Therefore, the productivity for forming in 140 sec. for a single lens having the maximum normal angle of 70° is three times that in 420 sec. of the total forming time in the case of the two-element lens.

As a lower limit of the maximum normal angle, therefore, it is possible to expect clear effects with 70°. However, it is also possible to expect sufficient effects with an angle of not less than 60° that is smaller than 70° by 10°, if the productivity that is about twice in place of three times as high as another is allowed.

Incidentally, the normal angle mentioned in the present specification is an angle formed by an optical axis and a normal line that is drawn on an optical surface (area through which a light flux passes) to pass through an optional point on the optical surface. A value of the greatest normal angle on the optical surface is called a greatest normal angle (maximum normal angle). In general formed lenses, a normal angle at a position on the optical surface is increased monotonously as the aforesaid position moves outwardly from the center of the optical surface. In the case of a general optical surface shape, therefore, the position where the maximum normal angle can be obtained is on the outermost circumference of the effective optical surface. However, monotonousness of increase and decrease of normal angles has no connection with the invention, and the position for the maximum normal angle is not always made to be at the outermost circumference of the optical surface, and it may be at an optional location on the optical surface. Incidentally, in the case of an area having therein a minute form such as a diffracting structure, a normal line is to be drawn on a base form such as a base aspheric surface, not on the actual optical surface.

Materials mentioned in the present specification represent all materials including general plastic and general glass which can be used for optical uses. An optical material to be loaded in a forming die in the course of press-forming may be either of an optical material formed to be a pre-form in advance, an optical material that is dropped in a form of a liquid drop and is loaded in a forming die, and a liquid that has no outer shape when loaded in the forming die.

A formed lens described in Item (2) is represented by a formed lens created by press-forming an optical material, wherein a maximum normal angle among normal angles each being formed between an optical axis and a straight line obtained when a normal line at an optional point on at least one optical surface is projected on a plane that includes the optical axis and is in parallel with the normal line is 60° to 90° at the greatest, and the position where the aforesaid straight line corresponding to the normal line that forms the greatest normal angle intersects with the optical axis is closer to the lens than at least one optical surface, and Abbe's number vd is not less than 60.

A formed lens described in Item (1) is one having an optical surface that is basically symmetric on a rotational basis about an optical axis, and on the optical surface which is symmetric on irrotational basis about the optical axis (nonaxisymmetric, including free curved surface), the normal line on the optical surface does not intersect usually with an optical axis. A formed lens described in Item (2) is one having an optical surface that is symmetric on a irrotational basis, and in this case, a plane which is in parallel with a normal line among planes including optical axes is considered, and let it be assumed that an angle formed by a straight line on the plane obtained by projecting the normal line on the plane (the normal line is projected on the plane to be in the direction perpendicular to the plane) and by an optical axis is called a normal angle. Other points than the foregoing are the same as those in the formed lens in Item (1) in terms of effects, and explanation for them will be omitted.

Figure 8:
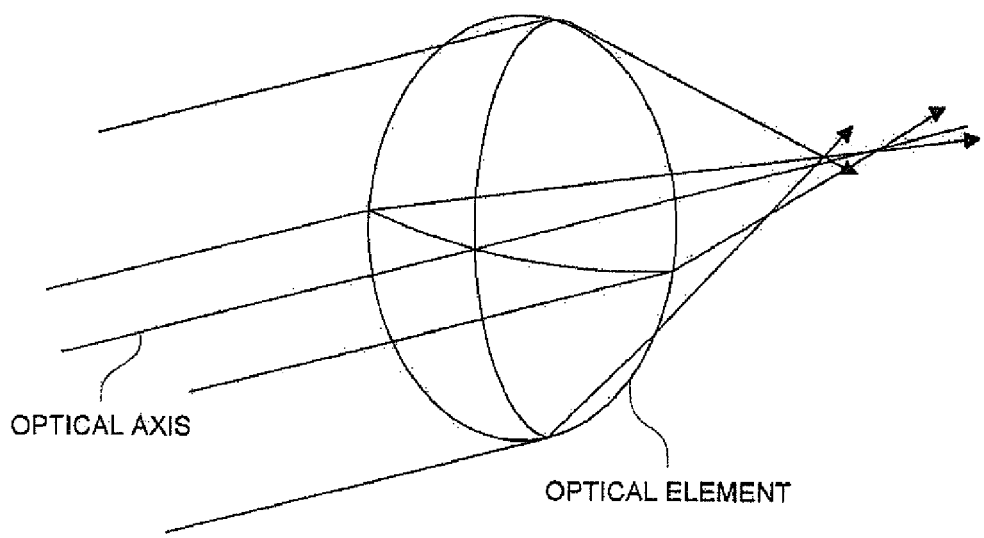
FIG. 8 is a perspective view showing an example of an optical element on which the optical surface is not in a shape of axial symmetry.

The invention described in Item (2) will be explained as follows, more concretely. When the optical surface is not in an axisymmetric shape, or in the case of a free curved surface, a normal line on a position on the optical surface sometimes does not intersect with an optical axis. For example, an optical element (in exaggeration, bearing a resemblance to a shape of a halved Rugby ball) shown in FIG. 8 is an example wherein a sectional form of a meridian plane that is perpendicular to an optical axis is different from others and an optical surface in a shape of a saddle is provided. The optical element of this kind can be used as an objective lens that converges a light flux emitted from a semiconductor laser, while correcting the astigmatic difference of the emitting point. In a general optical pickup device, a light flux emitted from a semiconductor laser is collimated by a collimator to be a light flux that is mostly parallel to enter an objective lens. However, at a point of time when it has passed the collimator, astigmatic difference still remains in the light flux, and a spread of the light flux in the direction perpendicular to the optical axis is different, which means that the light flux is not a perfect parallel light flux. However, when this light flux is made to enter the formed lens described in Item (2) in phase, the light flux having a greater angle of a spread can be converged on the optical surface in the direction of a greater curvature and a shorter focal length, while, the light flux having a smaller angle of a spread can be converged on the optical surface in the direction perpendicular to the light flux of a smaller curvature and a longer focal length, resulting in that a light flux in any direction is converged at the same position, and a small spot diameter can be obtained by a large amount of light.

Figure 9:
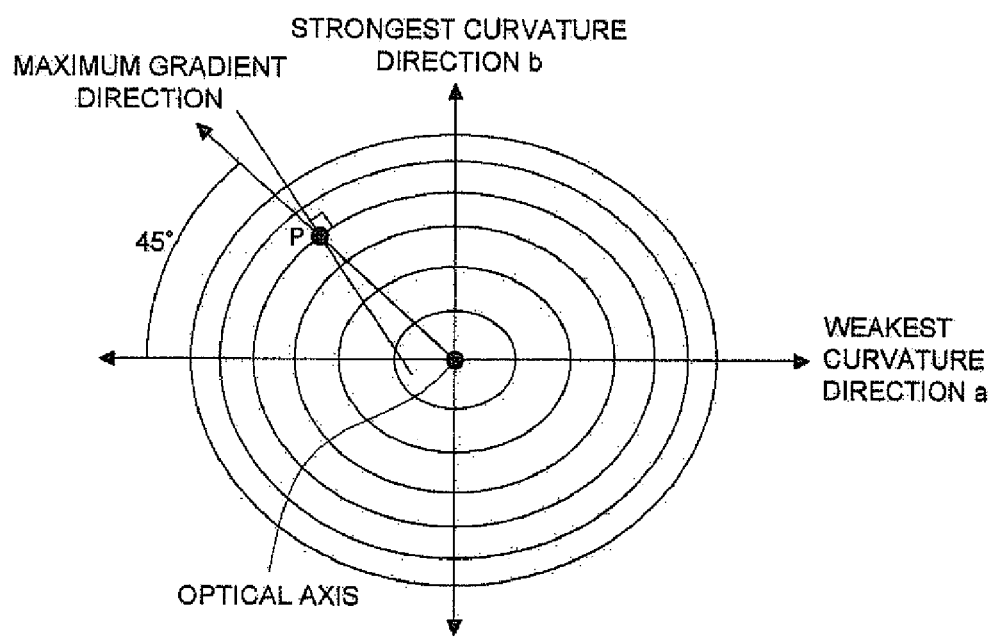
FIG. 9 is a diagram wherein an optical surface of an optical element in FIG. 8 is projected on a plane that is perpendicular to the optical axis, and displacement of the optical surface is shown with contour lines.

The optical surface of the optical element of this kind having a saddle shape was projected on a plane perpendicular to the optical axis, and displacement of the optical surface at that time was shown with contour lines, which is shown in FIG. 9. Normal lines at positions on the optical surface in direction "a" of a weakest curvature and in direction b of a strongest curvature intersect with an optical axis, and the definition described above can also be used for normal angles. However, when point P on the optical surface in the direction that is sandwiched between direction a and direction b, namely point P on the optical surface in the direction of 45° in FIG. 9 is considered, a contour line passing through point P is an ellipse, and with respect to its greatest inclination direction (direction perpendicular to the contour line), the normal line there does not pass through the optical axis. In short, the normal line at point P becomes a position of torsion for the optical axis, and therefore, in Item (2), if a normal angle is taken to be an angle formed by the normal line and an optical axis in accordance with a general definition, the normal angle cannot exist, which is irrational. However, the purpose is only to prescribe a sharp inclination on an optical axis of the optical surface, when the normal line of this kind is in the position (relationship) twisted for the optical axis as in the optical element shown in FIGS. 8 and 9, the normal angle is defined as follows, and its angle range is used as the normal angle in Item (2).

To be more concrete, for the normal line in the position twisted on the optical axis, a plane that is in parallel with the normal line and includes the optical axis is imagined, and an angle formed by the optical axis and a projected line on the plane that is formed when the normal line is projected vertically on the plane is defined as a normal angle. According to this definition, if the optical surface is steep on the optical axis, the normal angle is great, while, if the optical surface is gentle on the optical axis, the normal angle is small, and therefore, the normal angle can be handled in the same way as in the normal angle based on the conventional definition.

Even in the case of the nonaxisymmetric optical surface of this kind, the maximum normal angle is great, and it raises pressing pressure so that a die may be pressed by high pressure when an amount of deformation by forming of optical material is smaller. Thus, transferability is improved and required optical functions can be satisfied highly accurately. When using the formed lens described in Item (2) for correcting the astigmatic difference of a semiconductor laser, the greatest difference of an optical surface shape (amount of displacement in the direction of the optical axis) between the direction where the curvature of the optical surface is largest and the direction where the curvature of the optical surface is smallest is only about 150 nm in general. In spite of such small difference of the optical surface, the optical surface shape on which the maximum normal angle is 60° or more is extremely effective for accurate transfer for forming on the ground of the reason described earlier.

Incidentally, with respect to unevenness on the optical surface, when an intersection of the optical axis and the normal line (or projected straight line) is positioned to be in the lens material (optical material) for the boundary of the optical surface on the optical axis, it is defined as a convex surface, and when the intersection is positioned to be on the air side, it is defined as a concave surface.

With respect to the formed lens described in Item (3), it is preferable that the optical material is formed to be a pre-form before it is subjected to press-forming. In this case, the press stroke stated above can be made small, and high productivity can be attained.

The pre-form mentioned in the present specification means one formed before press-forming (a solid body or a liquid body provided with its outer shape). A solid body which has been subjected to processing before press-forming (primary processing) to be formed is naturally included.

With respect to the formed lens described in Item (4), it is preferable that the surface of the pre-form is in a shape wherein, for a sphere having the same volume as that in the pre-form, its radius with the same center as in the sphere is contained in a range of a shell between a spherical surface having a half radius and that having a doubled radius. The optical materials included within that range are assumed to be called "a sub-spherical shape". Namely, if the pre-form is in that shape, a formed lens having a large maximum normal angle satisfying characteristics of Item (1) or (2) can be formed with a higher precision under the higher productivity.

It is preferable that the formed lens described in Item (5) has a microscopic shape on the face of the optical surface. Namely, even when a microscopic shape is present on the face of the optical surface, if a formed lens satisfies characteristics of Item (1) or (2), the microscopic shape can be transferred from the forming die onto the formed lens with a high precision, because the transferability for forming is excellent.

In this case, the microscopic shape means a shape of unevenness for giving further optical functions to a base optical surface of a base aspheric surface for lens design, and it does not mean more minute shapes resulting from a mere transfer failure or from surface roughness of the forming die. As a microscopic shape, there are given, for example, a diffracting groove for giving a function to generate diffracted light and an antireflection structure for giving an antireflection function. AS a dimensional order of the microscopic shape of this kind, there is given an example of 100 nm-1 mm.

As a concrete example of those other than a diffracting groove, there is given one that is called SWS (Sub Wavelength Structure) and has unevenness smaller than a wavelength of a light source to be used. This may be of an antireflection structure called MOTH EYE that reduces a refractive index of the optical surface equivalently, or of a microscopic structure that conducts transmission or reflection selectively in accordance with a phase of light as a polarizing optical surface by means of oriented grooves, or of a microscopic structure that gives narrow band filter characteristics that conduct only transmission or reflection for specific wavelength. With regard to these microscopic structures, they are already popular as a known technology, and one of the inventors of the invention discloses them in TOKUGAN No. 2001-299711. Therefore, explanation for them will be omitted here. In particular, in forming of an optical element having the microscopic shape on its optical surface, highly accurate transfer that pushes softened optical materials into the innermost recess of the microscopic structure of the forming die is necessary, and if it is difficult, desired optical function cannot be exerted. For attaining the highly accurate transfer of this kind, if the optical surface shape becoming its base shape is an optical surface having a large maximum normal angle as shown in Items (1) and (2) in the formed lens of the invention, an amount of deformation of optical materials in press-forming can be small, thus, it is possible to press the optical material pressure against the forming die while keeping the optical material pressure to be high, and thereby, transferability for the microscopic structure can be improved, and high optical characteristics due to the microscopic functions can be secured.

In the formed lens described in Item (6), it is preferable that the microscopic shape stated above is a diffracting groove. When a diffracting groove is provided on the optical surface, utilization efficiency for light (diffraction efficiency) is extremely high and low cost formed lenses can be obtained.

In the formed lens described in Item (7), it is preferable that the refractive index at d line of the optical material mentioned above is less than 1.61. If the refractive index is small, a maximum normal angle on the lens optical surface can be made large in optical design, and formed lenses can be formed with a high precision and high efficiency.

In the formed lens described in Item (8), it is preferable that the aforesaid optical material is glass.

In the formed lens described in Item (9), it is preferable that the aforesaid optical material is plastic.

In the formed lens described in Item (10), it is preferable that it is used for an optical pickup device.

In the optical pickup device described in Item (11), it is preferable that a light source having wavelength λ1 (λ1≦450 nm), a light-converging optical system employing the formed lens described in either one of Items 1-9 as an objective lens and a photo-detector are provided, and information is recorded and/or reproduced when a light flux emitted from the light source is converged on an information recording surface of an optical information recording medium through the aforementioned light-converging optical system.

The embodiment of the invention will be explained as follows, referring to the drawings.

Figure 5:
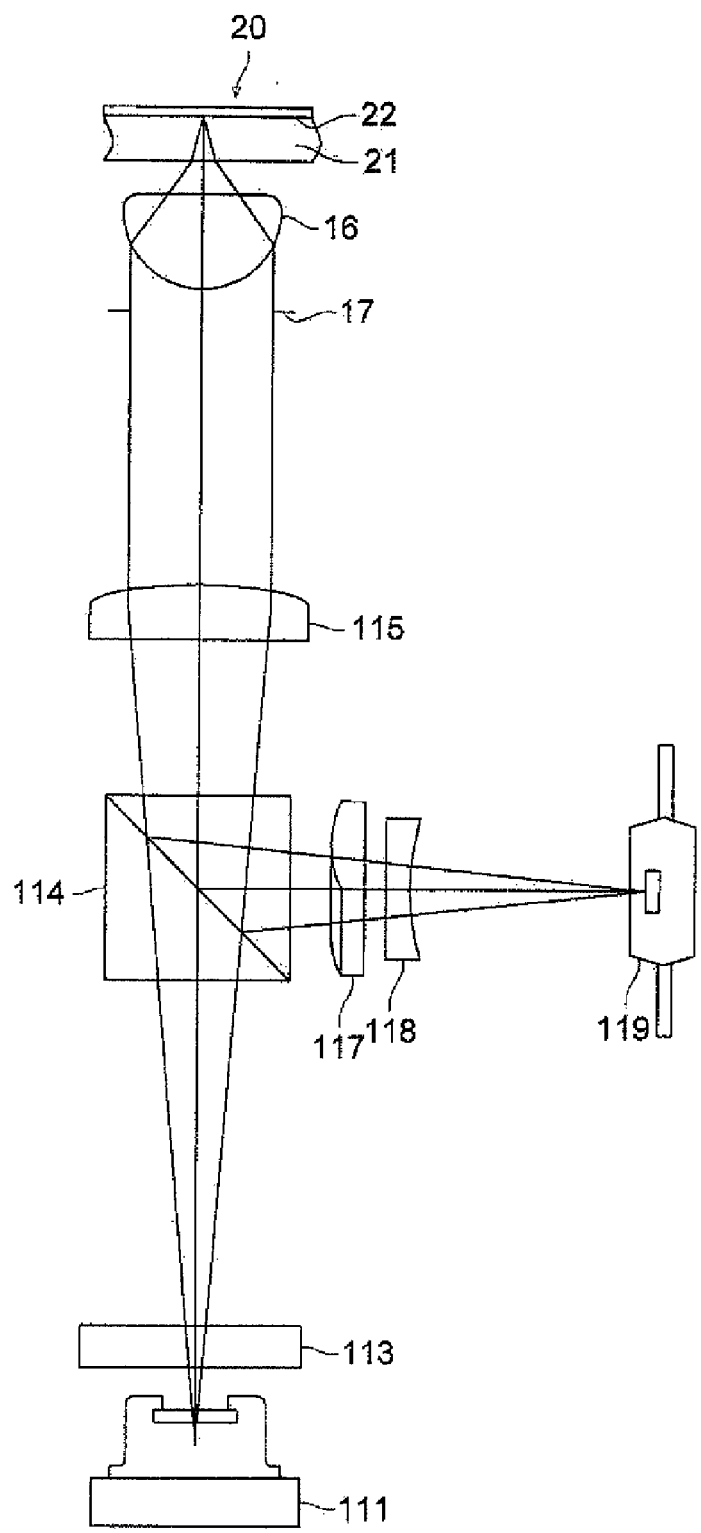
FIG. 5 is a schematic structure diagram of an optical pickup device.

FIG. 5 is a schematic structure diagram of an optical pickup device that conducts recording and reproducing of information for high density DVD and employs a formed lens relating to the present embodiment. In FIG. 5, a light flux emitted from semiconductor laser 111 (wavelength λ1=380 nm-450 nm) representing a light source is transmitted through ¼ wavelength plate 113 and beam splitter 114, then, is stopped down by diaphragm 17 after being transformed into a parallel light flux by collimator 115 representing a correcting element, and is converged by objective lens 16 representing a light-converging optical element on information recording surface 22 through protective layer 21 (thickness t1=0.1-0.7 mm) of optical disk 20.

Then, the light flux modulated by information bits and reflected on information recording surface 22 is transmitted again through objective lens 16 and diaphragm 17, then, passes through collimator 115, and enters beam splitter 114 and is reflected there to be given astigmatism by cylindrical lens 117, and it enters photo-detector 119 through concave lens 118, thus, output signals therefrom are used to obtain signals to read information recorded on optical disk 20.

Further, changes of an amount of light caused by changes in shape and position of a spot on photo-detector 119 are detected, and thereby, focusing detection and track detection are conducted. Based on these detections, a two-dimensional actuator (not shown) moves objective lens 16 so that a light flux emitted from semiconductor laser 111 may form an image on recording surface 22 of optical disk 20, and moves objective lens 1616 so that a light flux emitted from semiconductor laser 111 may form an image on a prescribed track.

EXAMPLE

FIG. 4 is a sectional view of an objective lens that converges a light flux that is emitted from a violet semiconductor laser and has a wavelength of 405 nm on information recording surface 22 of optical disk 20 with image-side numerical aperture NA of 0.85 in an optical pickup device in FIG. 5. FIG. 3 is a sectional view of a two-element objective lens representing a comparative example for the objective lens in FIG. 4.

On the first surface of the objective lens in FIG. 4, there are provided unillustrated diffracting grooves, and the diffracting grooves are in a shape of ring-shaped zones in a shape of concentric circles when they are viewed in the axial direction of the lens, and a minimum pitch of the diffracting grooves is 8.8 μm, the number of ring-shaped zones is 30 and its section is in a shape of serration. For the purpose of forming diffracting grooves equivalent to the aforementioned diffracting grooves, for comparison, on the first surface of the front lens that is shown in FIG. 3 and has maximum normal angle of 37°, there were provided diffracting grooves in a microscopic shape corresponding to the optical transfer surface of a forming die, and optical materials each being formed to be a pre-form under the forming condition considered to be optimum in each case were subjected to hot press forming, to be compared in terms of transferability. With respect to the optical materials, optical glass (M-BaCD5 made by HOYA Co.) having the same specifications such as Abbe's number vd 61.3 and refractive index nd 1.58913 was used for both objective lenses shown respectively in FIG. 3 and FIG. 4.

In the results of the foregoing, satisfactory transferability was observed in both lenses as far as a trough of the diffracting groove (convex portion in a forming die) is concerned, but dullness of about 0.7 μmR was caused on the objective lens in FIG. 4, and dullness of 3.5 μmR was caused on the objective lens in FIG. 3 with regard to a crest of the diffracting groove. This dull portion lowers diffraction efficiency greatly, and brightness on edge of image field for the objective lens in FIG. 4 showed a decline of about 8% from the ideal value, and that for the objective lens in FIG. 3 showed a decline of 46%. Apparently, there was observed a big difference in transferability of the diffracting grooves representing a microscopic structure of an optical surface, and in the peripheral portion where a pitch of diffracting grooves is small, in particular, a light flux was scattered and was not converged for the objective lens in FIG. 3, resulting in a critical decline of an amount of light, although the objective lens in FIG. 4 was kept within a usable range.

Further, in the case of the objective lens of an optical pickup device for conducting recording and/or reproducing for an optical disk with capacity of high density recording, NA is great, and in the case of a single lens, a lens shape is close to a spherical shape and chromatic aberration grows greater. In the objective lens in FIG. 4, on the other hand, it is possible to control occurrence of chromatic aberration and to obtain light-converging characteristic by employing diffracting grooves having a function to correct chromatic aberration, and it is further possible to ensure the working distance from the rear surface (second surface) of the lens to the surface of the optical disk to be as large as twice that for a two-element lens, by making the objective lens to be a single lens, thereby, it is possible to prevent interference between the objective lens and an optical disk when driving the objective lens to move in the direction of the optical axis for focus adjustment, which verifies that the aforementioned objective lens is extremely excellent.

A precision of the optical surface of the lens in FIG. 4 is as high as 50 nm or less, and eccentricity sensitivity is as extremely high as 20 seconds or less in tilt and 1 μm or less in shift, but the lens can be realized sufficiently by the recent forming technology stated above through hot press-forming.

As described earlier, referring to Table 1, in the case of a two-element lens, the total power as a light-converging lens can be shared by two lenses, and therefore, power of each individual lens is not required to be so great, maximum normal angle is 37° which is not so large and Abbe's number is about 56, which make it possible to obtain sufficient image forming capacity. In the single lens, on the contrary, the maximum normal angle is made to be as large as 72° by using refractive index materials having the refractive index similar to that of the two-element lens. In this case, the angle of refraction is increased by an amount equivalent to the increase of maximum normal angle, and a difference of deflection angle caused by a difference of a wavelength grows greater, causing a problem of great chromatic aberration which, however, is avoided by using optical materials having small dispersion and by providing diffracting grooves on the optical surface. Spherical aberration characteristics under this condition are shown respectively in FIGS. 6 and 7.

In the figures, spherical aberration for each wavelength is plotted, under the assumption that a wavelength of the light source is fluctuated by ±5 nm by mode hop and temperature characteristics from wavelength 405 nm of a violet semiconductor laser that serves as a center. If the graph does not generate a great difference from the graph of the central wavelength (405 nm), the focus movement is considered to be small, and if the graph is vertical and straight on the horizontal axis from the optical axis to the peripheral portion, axial chromatic aberration is considered to be corrected satisfactorily.

Figure 6:
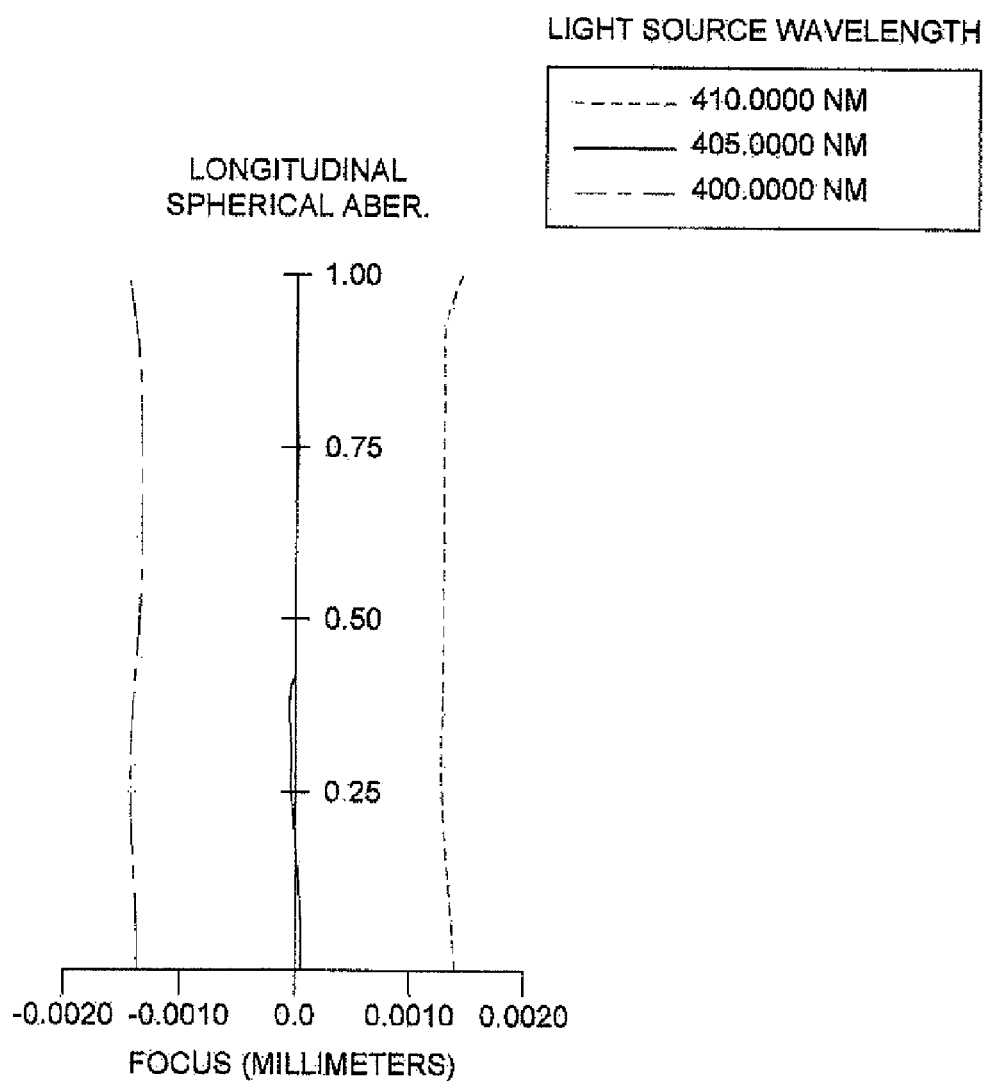
FIG. 6 is a diagram of aberration characteristics for a two-element objective lens.

When spherical aberration characteristics of the two-element lens in FIG. 6 are observed, the spherical aberration characteristic which is almost vertical on the horizontal axis for the central wavelength and is extremely flat is observed, and there is kept the straightforwardness of the graph that only moves in parallel when a wavelength of a light source is shifted, thus, axial chromatic aberration is corrected satisfactorily. With regard to the shift of focus, it is ±1.5 μm which is considerably excellent, and on the wavefront aberration conversion, it is 86 mλ per 1 nm from Table 2, and it is not problematic on practical use.

Figure 7:
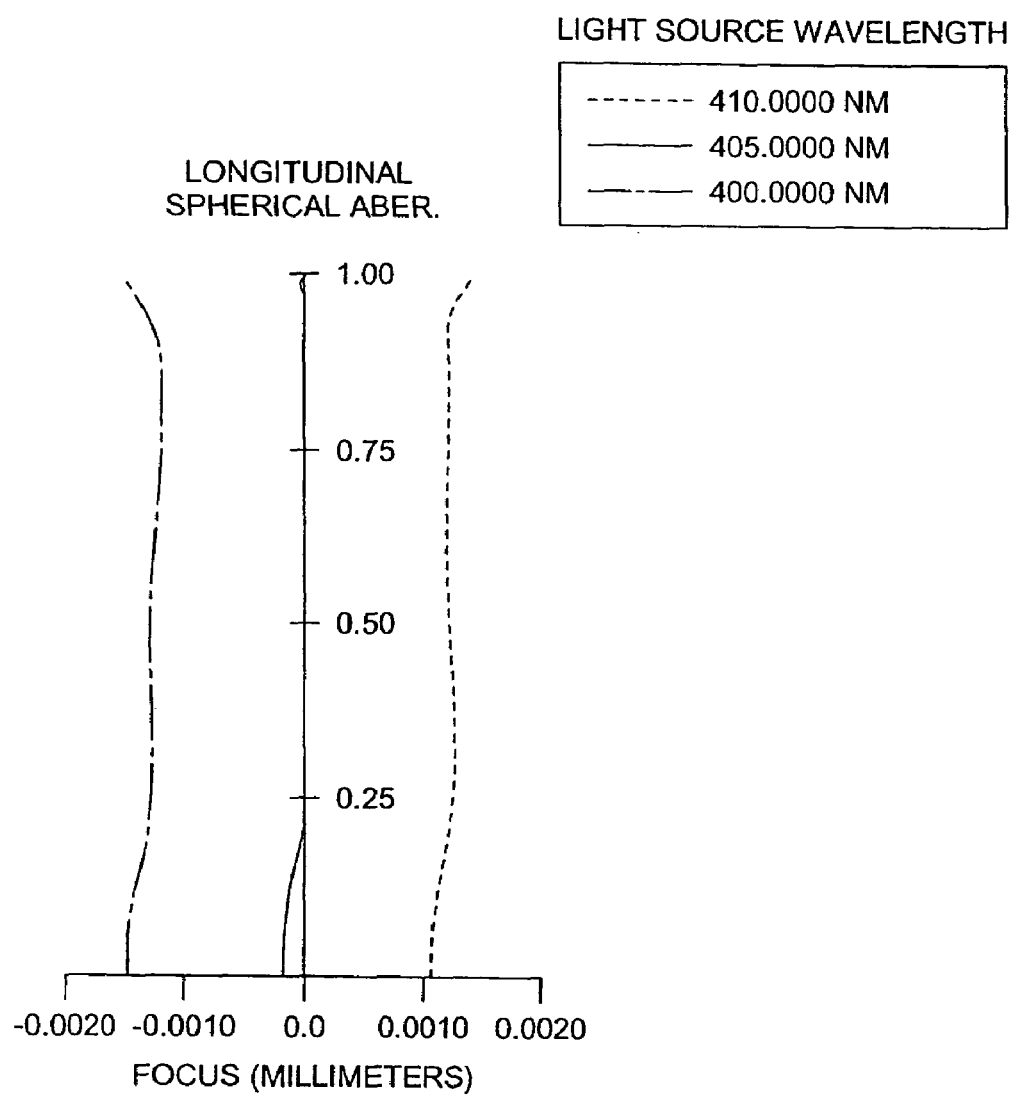
FIG. 7 is a diagram of aberration characteristics for a single objective lens.

On the other hand, FIG. 7 shows spherical aberration characteristics of a single lens which are extremely similar to those of the two-element lens in FIG. 6, which indicates that the spherical aberration characteristics and wavelength characteristics which are mostly the same as those in a two-element lens are realized by a single lens.

Table 2 mainly shows wavefront aberration characteristics which depend on wavelength of each of the two-element lens and the single lens, and the smaller the value is, the more excellent the aberration characteristic is. The axial wavefront aberration shows good values if the graph is in a normal line (vertical) on the optical axis in the spherical aberration diagrams (FIGS. 5 and 6) as described above. The axial chromatic aberration shows good values if the graph of spherical aberration is vertical for wavelength fluctuation and is close to the graph for the central wavelength as far as possible. The mode hop characteristics shows a degree of deterioration of aberration caused by shift of focus in the case of a change in wavelength of a light source when a focus position is fixed, and it shows good values when the graph for the central wavelength is close to the graph for each other wavelength in the spherical aberration diagram. In this case, there is shown the aberration fluctuation amount for the same focus position in the case where a wavelength of the semiconductor laser representing a light source is changed by mode hop by 1 nm, but there is no problem for practical use if the aberration fluctuation amount is not more than 100 mλ because a temperature change of about 15° C. is needed for the wavelength to be changed by 1 nm in the actual mode hop characteristics. The temperature characteristic shows an amount of aberration fluctuation generated by changes of the refractive index of optical materials caused by temperature changes. The wavelength characteristic shows residual aberration in the occasion where focus taking is made when the wavelength is made to be the central wavelength plus 5 nm, and it shows good values when the graph of each wavelength is closer to the normal line in the spherical aberration diagram.

TABLE 2

| NA0.85 405 nm | Axial wavefront aberration | Off-axial wavefront aberration (image height 0.5 mm) | Axial chromatic aberration (μm/nm) | Mode hop characteristics (+1 nm) | Temperature characteristics (+30° C.) | Wavelength characteristics (+5 nm) |
|---|---|---|---|---|---|---|
| Two-element lens | 1 mλ | 20 mλ | 0.26 | 86 mλ | 13 mλ | 2 mλ |
| Single lens | 1 mλ | 20 mλ | 0.25 | 81 mλ | 13 mλ | 5 mλ |

In the optical pickup device, the objective lens having the values in Table 2 can be put to practical use on the whole, because allowable values of wavefront aberration are about 30 mλ. Further, the wavelength characteristics are mostly the same for the two-element lens and for the single lens, and it has become clear that the wavelength characteristics which are mostly the same as the two-element lens can be realized in the single lens by using optical materials having small dispersion and by forming diffracting grooves, even when the maximum normal angle of the single lens is made to be great rapidly.

Namely, it has become clear that, in the single lens, it is possible to raise stability of forming and to increase speed of forming to ensure the extremely high productivity by making the maximum normal angle to be great rapidly, and to control deterioration of the wavelength characteristics representing a drawback by using materials having small dispersion optically, and thereby to realize efficiencies for practical use which are the same as those in the two-element lens.

Further, in the single lens, the working distance is just twice that of the two-element lens as is understood from FIGS. 3 and 4, and thereby, a fear of interference between an objective lens and an optical disk that is caused when the objective lens is servo-driven for focus adjustment is drastically reduced, thus, it was possible to ensure reliability backed by compact structure and high servo-functions.

A formed lens that is highly accurate and can realize high optical efficiencies with low cost and can offer the effects described concretely in the aforementioned embodiment proved to be one which can be obtained if Abbe's number of optical material thereof is 60 or more when creating a lens having a convex optical surface on which the maximum normal angle is not less than 60 and is not more than 90 through press-forming.

As shown in Table 1, the optical design of this kind has become possible by using the optical material having Abbe's number of 60 or more despite the use of a refractive index which is mostly the same, and for expecting the effects of the invention, it is preferable that Abbe's number is 60 or more as the lower limit of dispersion.

Though the invention has been explained, referring to the embodiment, the invention should not be construed to be limited to the aforementioned embodiment, appropriate modification and improvement may naturally be made. The formed lens of the invention may also be used for a collimator and a cylindrical lens, without being limited to an objective lens of an optical pickup device. Further, the optical pickup device may also be one capable of recording and/or reproducing for information recording media such as various optical disks without being limited to one capable of recording and/or reproducing for high density DVD described in the present embodiment. Further, a use of the formed lens is not limited to that for an optical pickup device.

As stated above, the invention makes it possible to provide a formed lens wherein a higher accurate shape is obtained and high optical efficiencies can be realized with low cost, from a concept that is different from a conventional design method, and to provide a highly capable optical pickup device employing the formed lens mentioned above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of producing a lens, the method comprising the steps of:
    shifting a first die relative to a second die; and
    pressing an optical glass material shaped in a preliminary form between the first die and the second die so as to form a lens having a configuration corresponding to a hollow portion formed by the first die and the second die while shifting the first die relative to the second die,
    wherein the lens comprises an effective optical surface configured to converge a light flux, the effective optical surface comprising a light entrance side, a light exit side, and an optical axis,
    wherein the effective optical surface is a convex surface shaped such that when a maximum normal line angle is defined as an angle formed between the optical axis and a normal line at an outermost circumference of the effective optical surface, the maximum normal angle is 60° to 90° and a maximum normal line forming the maximum normal line angle intersects with the optical axis at an intersection located at the light exit side of a point of the maximum normal line on the optical surface, and
    wherein the preliminary form of the optical glass material is shaped such that a sphere having a same volume of the preliminary form is defined as an equivalent sphere.

2. The method of claim 1, wherein the maximum normal angle is 70° to 90°.

3. The method of claim 1, wherein Abbe's number vd of the optical glass material is at least 60.

4. The method of claim 1, wherein the optical glass material has a refractive index not larger than 1.61 for d-line.

5. The method of claim 1, wherein the optical surface includes a microscopic structure.

6. The method of claim 5, wherein the microscopic structure includes diffractive grooves.

7. The method of claim 1, wherein when a normal line does not intersect with the optical axis, a corresponding normal angle is an angle formed between the optical axis and a line obtained by projecting the normal line on a plane that is parallel to the normal line and includes the optical axis.

8. The method of claim 1, wherein a forming time of the optical glass material shaped in the preliminary form is not more than 280 sec.

* * * * *